US007258109B2

(12) United States Patent
Mennicken

(10) Patent No.: US 7,258,109 B2
(45) Date of Patent: Aug. 21, 2007

(54) METHOD FOR OPERATING A FUEL INJECTION DEVICE, ESPECIALLY FOR A MOTOR VEHICLE

(75) Inventor: Michael Mennicken, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/188,170

(22) Filed: Jul. 22, 2005

(65) Prior Publication Data

US 2006/0022554 A1 Feb. 2, 2006

(30) Foreign Application Priority Data

Jul. 31, 2004 (DE) ...................... 10 2004 037 255

(51) Int. Cl.
*F02M 51/06* (2006.01)
*H02N 2/06* (2006.01)

(52) U.S. Cl. .................. 123/479; 310/316.03; 123/490

(58) Field of Classification Search ..................... None
See application file for complete search history.

(56) References Cited

U.S. PATENT DOCUMENTS

2003/0106533 A1* 6/2003 Crofts et al. ................ 123/446
2005/0121535 A1* 6/2005 Pirkl et al. ..................... 239/5

FOREIGN PATENT DOCUMENTS

GB 2366664 3/2002
WO WO 03/104633 A1 * 12/2003

* cited by examiner

*Primary Examiner*—Tony M. Argenbright
*Assistant Examiner*—Arnold Castro
(74) *Attorney, Agent, or Firm*—Kenyon & Kenyon LLP

(57) ABSTRACT

A method for operating a fuel injection device, particularly of a motor vehicle. The fuel injection device is provided with an injection valve which has a piezoelectric element. In using the method, the piezoelectric element is activated in such a way that the injection valve goes over into an opened state. During the activation, an electrical voltage is ascertained and/or prespecified at the piezoelectric element and/or an electrical current is ascertained and/or specified via the piezoelectric element. From the path of the voltage and/or from the path of the current one may infer the point in time of opening of the injection valve.

5 Claims, 2 Drawing Sheets

METHOD FOR OPERATING A FUEL INJECTION DEVICE, ESPECIALLY FOR A MOTOR VEHICLE

FIELD OF THE INVENTION

The present invention relates to a method for operating a motor vehicle fuel injection device, especially for a motor vehicle. The present invention also relates to a corresponding computer program, a corresponding electrical memory as well as a corresponding control unit.

BACKGROUND INFORMATION

A method is known, from Great Britain Patent No. GB 2,366,664. In that document, the fuel injection device has an injection valve that is outfitted with a piezoelectric element. By an appropriate activation, the injection valve may be brought into an open and a closed state. A prespecified electrical voltage has to be applied to the piezoelectric element in order to bring the injection valve into the open state. In this open state, an injection orifice is unblocked by a nozzle needle, so that the fuel is injected, for instance, into a combustion chamber of an internal combustion engine.

To determine the mass of the injected fuel, it is necessary to ascertain the point in time of the opening of the injection valve.

It is an object of the present invention to provide a method for operating a motor vehicle injection device, especially for a motor vehicle, using which, the point in time of the opening of the injection valve may be determined in a simple manner.

SUMMARY OF THE INVENTION

According to the present invention, the voltage and/or the current is either prespecified or ascertained via the piezoelectric element. In this context, the ascertainment may take place by measurement or in some other way. The path (curve) of the voltage and/or the path of the current is then used to ascertain the point in time of the opening of the injection valve.

An important advantage of the method according to the present invention is that no additional sensor or the like is required for the ascertainment, according to the present invention, of the point in time of the opening of the injection valve.

It is possible, for example, to hold the voltage at the piezoelectric element approximately constant and to ascertain the current flowing through the piezoelectric element. According to the present invention, from the ascertained path of the current one may then conclude what the point in time of opening of the injection valve is. This point in time of opening may then be drawn upon for determining the injected fuel mass.

In one advantageous refinement of the present invention, the current is checked to see whether the current remains unequal to zero directly after that voltage is reached which is required to bring the injection valve into the opened state. Normally, the current through the piezoelectric element would have to tend to zero directly after the reaching of the voltage named. If this is not the case, that is, if the current remains unequal to zero, one may conclude from this that there was a correct opening of the injection valve, and one may draw a conclusion on the point in time of the opening of same.

DETAILED DESCRIPTION

Figure 1:
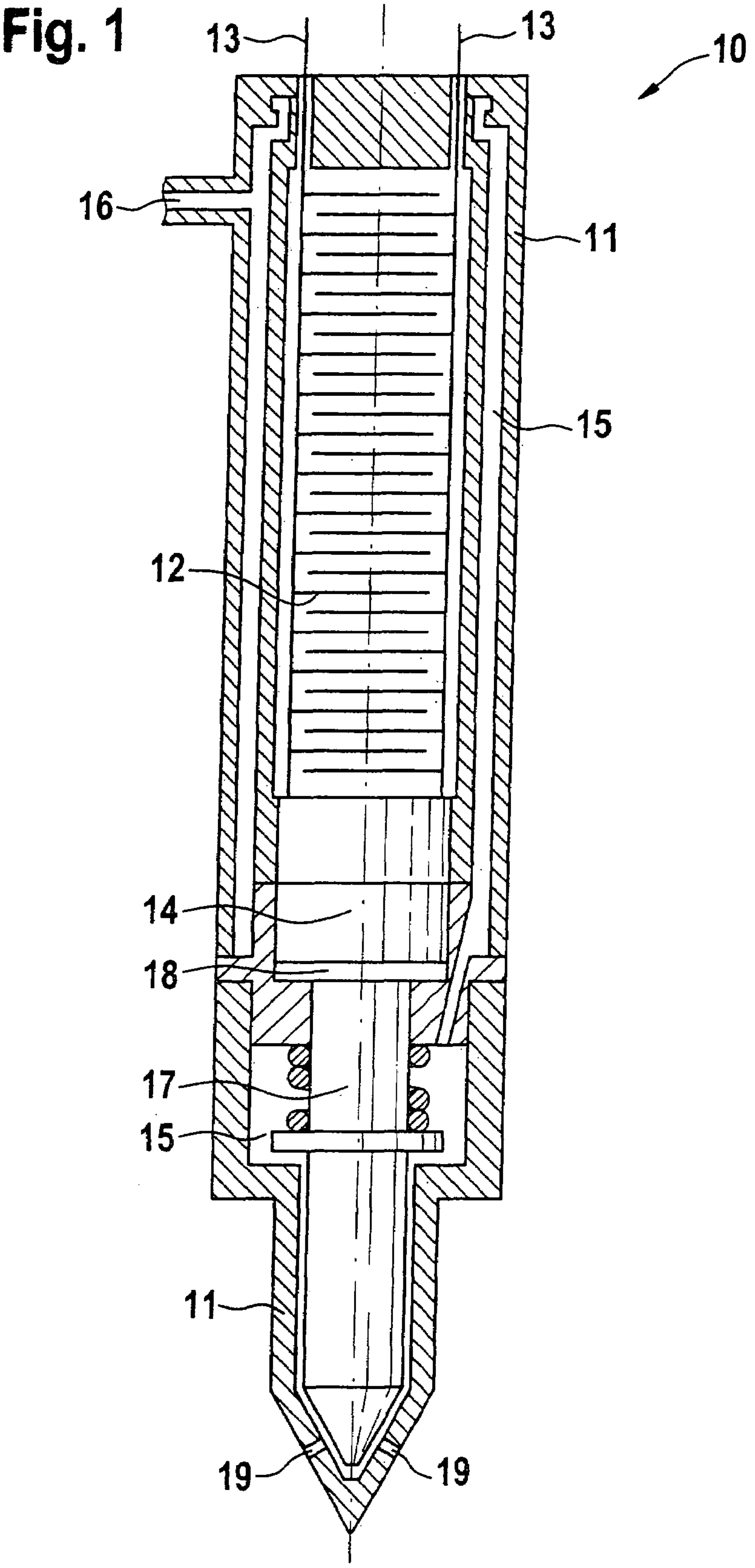
FIG. 1 shows a schematic sectional representation of an exemplary embodiment of an injection valve of a fuel injector device according to the present invention.

FIG. 1 shows an injection valve 10 for injecting fuel into a combustion chamber of an internal combustion engine. Injection valve 10 is a component of a fuel injection device, and is provided especially for use in a Diesel internal combustion engine of a motor vehicle.

A cylindrical piezoelectric element 12 is accommodated in an essentially cylindrical housing 11. One of its ends is fastened at the appertaining end of housing 11. At this end, piezoelectric element 12 is provided with an electrical connection 13. A coupler piston 14 is held at the other end of piezoelectric element 12.

Between housing 11 and piezoelectric element 12 and coupler piston 14 there is an annular gap 15 which is filled with fuel during operation. At the end of piezoelectric element 12 opposite coupler piston 14, housing 11 is provided with an inlet 16, via which the fuel reaches the annular gap.

A nozzle needle 17 is accommodated in the housing in the extension of piezoelectric element 12. The end of nozzle needle 17 is opposite coupler piston 14. Between nozzle needle 17 and coupler piston 14 there is a control space 18 that is sealed from annular gap 15. Control space 18 is filled with fuel. The pressure within control space 18 is, per se, independent of the pressure acting on the fuel in annular gap 15, but, because of leakage, the pressure in control space 18 tracks the pressure present in annular gap 15, at a time delay.

The other end of nozzle needle 17 and the appertaining end of housing 11 are adapted to each other in their shape. At this end of housing 11 there are one or more injection orifices 19, via which the fuel is injected.

The shape of nozzle needle 17 and housing 11 are developed in such a way that nozzle needle 17, in a closed state, sealingly comes to rest against a seating line in housing 11, so that no fuel gets to injection orifices 19, and so that no fuel is injected. In an open state there is a gap between nozzle needle 17 and housing 11, via which the fuel advances to injection orifices 19, and is injected there. The open state is shown in FIG. 1.

Nozzle needle 17 is provided with a spring by which nozzle needle 17 is pressed in the direction of its closed state.

In the operation of injection valve 10, the fuel present in annular gap 15 is under high pressure.

The closed state of injection valve 10 is arrived at in that, at connection 13 an electrical voltage U has been applied that is greater than zero. This voltage U is also designated from here on as output voltage. This voltage U leads to an extension of piezoelectric element 12 in the longitudinal direction. This movement of piezoelectric element 12 is transmitted via coupler piston 14 and control space 18 to nozzle needle 17. Thereby nozzle needle 17 executes a lift H in the longitudinal direction, and comes to a stop at housing 11. As was explained, injection valve 10 is closed thereby, and no fuel is injected.

In the closed state of injection valve 10, on the one hand, the high pressure present in the annular gap, which may amount to a pressure such as 1000 bar, acts upon nozzle needle 17, and, on the other hand, there acts upon nozzle needle 17, via injection orifices 19, the pressure present in the combustion chamber, which may amount to about 100 bar. Among other things, because of this pressure difference, nozzle needle 17 is held in its closed state.

The opened state of injection valve 10 is arrived at in that, at connection 13 an electrical voltage U has been applied that is clearly less than the above-mentioned output voltage. This voltage U leads to a discharge and thereby to a contraction of piezoelectric element 12 in the longitudinal direction. This movement of piezoelectric element 12 is transmitted via coupler piston 14 and control space 18 to nozzle needle 17. In control space 18, there occurs a pressure reduction, in this context. Thereupon nozzle needle 17 executes a lift H in the longitudinal direction, and lifts off from housing 11. As was explained, injection valve 10 is opened thereby, and fuel is injected.

Figure 2:
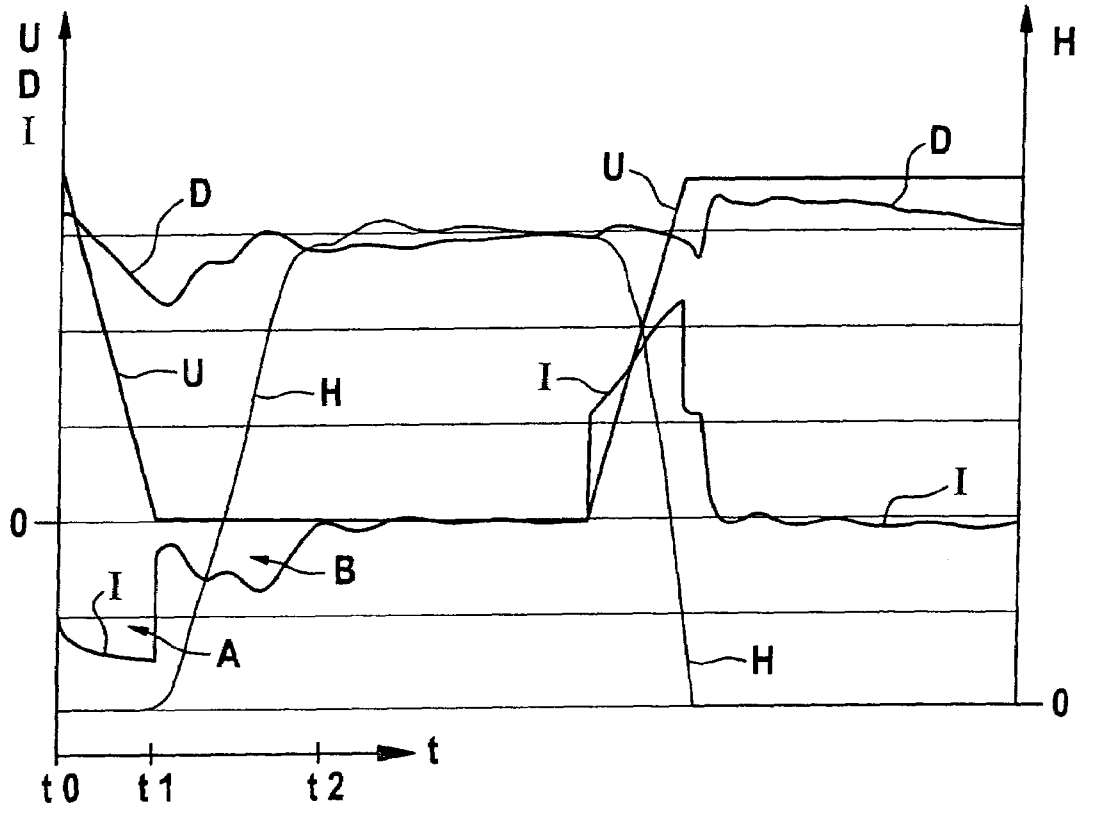
FIG. 2 shows a schematic diagram of operating variables of the injection valve of FIG. 1.

In FIG. 2, above-mentioned voltage U, the resulting lift H of nozzle needle 17, the pressure D in control space 18 and an electric current I are plotted against time t. Furthermore, two zero lines are entered in FIG. 2. Voltage U, pressure D and current I are based on the zero line marked at the left, while lift H appertains to the zero line marked at the right.

At a point in time t0, voltage U is greater than zero and lift H is at zero. A current I flows which is less than zero and which is a function of voltage U and the resistance value represented by piezoelectric element 12. Pressure D in control space 18 is greater than zero.

After point in time t0, voltage U at connection 13 is reduced, in fact, specifically voltage U is linearly shut down, so that, at a point t1 it becomes 0. As was explained, this results in a contraction of piezoelectric element 12. This, in turn, has the effect of lowering pressure D in control space 18, as is shown in FIG. 2 between times t0 and t1. This reduction in pressure D has the result that lift H of nozzle needle 17 also changes, and it does this at a time delay after point in time t1. This is shown in FIG. 2 as an increase in lift H of nozzle needle 17 after time t1.

The increase in lift H of nozzle needle 17 first has the result that nozzle needle 17 lifts off from housing 11, as was explained. This has the result that fuel is able to penetrate between nozzle needle 17 and housing 11. However, this is synonymous with the pressure acting on nozzle needle 17 rising, based on the fuel that has penetrated. This pressure is transmitted via nozzle needle 17 to control space 18, and there it leads to an increase in pressure D in control space 18. This increase in pressure D represents an additional hydraulic force, and is shown in FIG. 2 after time t1.

As was explained, voltage U is reduced to zero between time t0 and t1. During this time period, there flows a current I that is less than zero. This time region is additionally labeled in FIG. 2 with the reference character A. After the voltage has become 0 at point in time t1, current I changes abruptly in the direction of zero.

However, the increase in pressure D in control space 18, that was explained above, has the result that piezoelectric element 12 contracts not only because of voltage U that is present, but that piezoelectric element 12 is compressed additionally by the pressure D. This has the result that a charge transfer takes place in piezoelectric element 12, so that, at constant voltage of piezoelectric element 12, a current I is generated that is shown after time t1 in FIG. 2.

The lifting off of nozzle needle 17 from housing 11 also has the result that the high pressure acting on the fuel in annular gap 15 now also acts on nozzle needle 17, and reinforces its lifting off procedure. This further leads to piezoelectric element 12 being compressed by the high pressure now acting. The result is that piezoelectric element 12, at constant voltage U, generates a current I and supplies it.

Thus, at time t1 current I does not jump to zero, but, based on the procedures explained above, there is still available, for a certain time period, a current I that is not equal to zero. This time region is additionally labeled in FIG. 2 with the reference character B. In this context, time period B begins directly after time t1, and ends approximately at time t2. Only at the end of this time period B does current I essentially return to zero.

It should be pointed out that, in the preceding explained procedures, current I may also be held constant, voltage U changing thereby, based on the high pressure acting on piezoelectric element 12. It is also possible that both quantities change, and therewith the high pressure acting on piezoelectric element 12 leads to a combined voltage and current generation.

Voltage U present at connection 13 of piezoelectric element 12, and current I, flowing via connection 13 and thus through piezoelectric element 12, are measured or ascertained by other means.

By a suitable evaluation it may be decided whether and when an additional increase in pressure D in control space 18, and thus an additional hydraulic force is acting upon piezoelectric element 12. This is synonymous with a detection of the point in time of opening of the injection valve, and therewith of the injection beginning.

In the case of activation using a prespecified voltage U corresponding to FIG. 2, for example, the occurrence of time period B may be ascertained. This ascertainment may be carried out with the aid of the path of voltage U and/or the path of current I. In particular, it may be ascertained whether a path of current I is available, as is the case, according to the preceding explanations, in time period B.

If a current path corresponding to time period B is established, it may be concluded from this that nozzle needle 17 of injection valve 10 has opened. This represents the point in time of opening of injection valve 10. Consequently, the opening time of injection valve 10 may be derived from the position in time of time period B.

Consequently, using the path of voltage U and the path of current I, that point in time may be ascertained, via the current path in time period B, at which nozzle needle 17 of injection valve 10 has opened. This point in time of opening may then be drawn upon, among other things, for determining the injected fuel mass.

Furthermore, it may be established, in connection with the path of voltage U and the path of current I, whether injection valve 10 has opened in a correct manner after activation with the appropriate voltage U. This represents a functional test for the opening procedure of injection valve 10.

The method described may be carried out with the aid of an analog or a digital control unit. In particular, the control unit may have a microprocessor that is provided with a computer program that is programmed to carry out the method described. The computer program may be stored in an electrical memory, for example, in a so-called flash memory.

What is claimed is:

1. A method for operating a fuel injection device, comprising:

activating a piezoelectric element of an injection valve in such a way that the injection valve goes over into an opened state, wherein the injection valve injects fuel directly into a combustion chamber;

at least one of (a) at least one of ascertaining and prespecifying an electrical voltage at the piezoelectric element and (b) at least one of ascertaining and specifying an electrical current via the piezoelectric element, during the activation;

inferring a point in time of opening of the injection valve as a function of a path of at least one of the voltage and the current, wherein the voltage is prespecified and the current is ascertained, and from the path of the current a point in time of opening of the injection valve is inferred;

checking the current to determine whether the current remains unequal to zero directly after the voltage is reached which is required to bring the injection valve into the opened state; and establishing a possible malfunction of the injection valve provided, directly after the voltage is reached which is required to bring the injection valve into the opened state, the current approaches zero.

2. The method according to claim 1, wherein the fuel injection device is of a motor vehicle.

3. The method according to claim 1, wherein the injection valve includes a nozzle needle which executes a lift, and wherein about directly after reaching the voltage that is necessary for bringing the injection valve into the opened state, there takes place a change in the lift of the nozzle needle into the opened state of the injection valve.

4. A computer-readable medium containing a computer program which when executed by a processor performs the following method for operating a fuel injection device:

activating a piezoelectric element of an injection valve in such a way that the injection valve goes over into an opened state, wherein the injection valve injects fuel directly into a combustion chamber;

at least one of (a) at least one of ascertaining and prespecifying an electrical voltage at the piezoelectric element and (b) at least one of ascertaining and specifying an electrical current via the piezoelectric element, during the activation;

inferring a point in time of opening of the injection valve as a function of a path of at least one of the voltage and the current, wherein the voltage is prespecified and the current is ascertained, and from the path of the current a point in time of opening of the injection valve inferred;

checking the current to determine whether the current remains unequal to zero directly after the voltage is reached which is required to bring the injection valve into the opened state; and establishing a possible malfunction of the injection valve provided, directly after the voltage is reached which is required to bring the injection valve into the opened state, the current approaches zero.

5. An electrical memory in which a computer program is stored that is programmed to carry out the following method for operating a fuel injection device:

activating a piezoelectric element of an injection valve in such a way that the injection valve goes over into an opened state, wherein the injection valve injects fuel directly into a combustion chamber;

at least one of(a) at least one of ascertaining and prespecifying an electrical voltage at the piezoelectric element and (b) at least one of ascertaining and specifying an electrical current via the piezoelectric element, during the activation;

inferring a point in time of opening of the injection valve as a function of a path of at least one of the voltage and the current, wherein the voltage is prespecified and the current is ascertained, and from the path of the current a point in time of opening of the injection valve is inferred;

checking the current to determine whether the current remains unequal to zero directly after the voltage is reached which is required to bring the injection valve into the opened state; and establishing a possible malfunction of the injection valve provided, directly after the voltage is reached which is required to bring the injection valve into the opened state, the current approaches zero.

* * * * *